United States Patent
Dong

(10) Patent No.: US 12,418,913 B2
(45) Date of Patent: Sep. 16, 2025

(54) METHOD FOR TRANSMITTING DOWNLINK DATA ON PHYSICAL DOWNLINK SHARED CHANNEL (PDSCH) RESOURCE ACCORDING TO OCCUPANCY SIGNAL

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 396 days.

(21) Appl. No.: 17/928,243

(22) PCT Filed: May 28, 2020

(86) PCT No.: PCT/CN2020/092938
§ 371 (c)(1),
(2) Date: Nov. 28, 2022

(87) PCT Pub. No.: WO2021/237573
PCT Pub. Date: Dec. 2, 2021

(65) Prior Publication Data
US 2023/0232399 A1 Jul. 20, 2023

(51) Int. Cl.
*H04W 72/1273* (2023.01)
*H04W 72/232* (2023.01)
*H04W 74/0808* (2024.01)

(52) U.S. Cl.
CPC ..... *H04W 72/1273* (2013.01); *H04W 72/232* (2023.01); *H04W 74/0808* (2013.01)

(58) Field of Classification Search
CPC ........... H04W 72/1273; H04W 72/232; H04W 74/0808; H04W 8/20; H04W 36/0072;
(Continued)

(56) References Cited

U.S. PATENT DOCUMENTS

2014/0036853 A1* 2/2014 Kim ................. H04L 5/0053
370/329
2017/0215179 A1* 7/2017 Choi ................. H04W 16/14
(Continued)

FOREIGN PATENT DOCUMENTS

| CN | 104301273 A | 1/2015 |
| CN | 105429740 A | 3/2016 |

(Continued)

OTHER PUBLICATIONS

CNOA issues in Application No. 202080001114.1 dated Dec. 11, 2024 with English translation, (16p).
(Continued)

*Primary Examiner* — Mewale A Ambaye
(74) *Attorney, Agent, or Firm* — Arch & Lake LLP; Hao Tan; Shen Wang

(57) ABSTRACT

The present disclosure relate to methods for transmitting information, and communication devices. The method includes: sending an occupancy signal in response to a downlink control information (DCI) sent by a base station to the UE for scheduling a physical downlink shared channel (PDSCH) resource in an unlicensed frequency spectrum being detected in a physical downlink control channel (PDCCH) resource of the unlicensed frequency spectrum, where the occupancy signal is used to indicate that a channel of the PDSCH resource is to be occupied.

19 Claims, 7 Drawing Sheets

(58) Field of Classification Search
CPC . H04W 74/0816; H04W 72/04; H04W 72/20; H04W 72/23

See application file for complete search history.

(56) References Cited

U.S. PATENT DOCUMENTS

| | | | |
|---|---|---|---|
| 2017/0265170 A1 | 9/2017 | Park et al. | |
| 2017/0280331 A1 | 9/2017 | Gou et al. | |
| 2017/0339693 A1 | 11/2017 | Cierny et al. | |
| 2017/0353866 A1 | 12/2017 | Gou et al. | |
| 2018/0007688 A1* | 1/2018 | Fu | H04W 72/0446 |
| 2018/0070244 A1 | 3/2018 | Wu et al. | |
| 2019/0394665 A1* | 12/2019 | Kim | H04W 72/542 |
| 2020/0053713 A1* | 2/2020 | Bang | H04L 5/0053 |
| 2020/0053782 A1* | 2/2020 | Zhang | H04W 74/0816 |
| 2020/0068569 A1 | 2/2020 | Fu et al. | |
| 2022/0361231 A1* | 11/2022 | Oh | H04L 1/1822 |
| 2023/0156786 A1* | 5/2023 | Myung | H04W 74/0808 370/329 |

FOREIGN PATENT DOCUMENTS

| | | | |
|---|---|---|---|
| CN | 105743626 | * | 7/2016 |
| CN | 105743626 A | | 7/2016 |
| CN | 105848165 A | | 8/2016 |
| CN | 105992345 A | | 10/2016 |
| CN | 106465139 A | | 2/2017 |
| CN | 107079302 A | | 8/2017 |
| CN | 107736070 A | | 2/2018 |
| CN | 110505026 A | | 11/2019 |
| CN | 110581754 A | | 12/2019 |
| CN | 111031580 A | | 4/2020 |
| CN | 111183703 A | | 5/2020 |
| WO | 2016037471 A1 | | 3/2016 |
| WO | 2020088775 A1 | | 5/2020 |
| WO | 2020091554 A1 | | 5/2020 |

OTHER PUBLICATIONS

Catt, "DL/UL scheduling for LAA", 3GPP TSG RAN WG1 Meeting #80bis, R1-151360, Belgrade, Serbia, Apr. 20-24, 2015, (4p).

Charter Communications, "Further Aspects of Channel Access", 3GPP TSG RAN WG1 Meeting #98, R1-1908338, Prague, Czech Republic, Aug. 26-30, 2019, (4p).

Ericsson, "Channel access mechanisms for NR-U", 3GPP TSG-RAN WG1 Meeting #95, R1-1814020, Spokane, USA, Nov. 12-16, 2018, (12p).

International Search Report issued in Application No. PCT/CN2020/092938 dated Mar. 4, 2021, (6p).

Qualcomm Incorporated., "TxOP Frame Structure for NR unlicensed", 3GPP TSG RAN WG1 Meeting #93, R1-1807386, Busan, Korea, May 20-25, 2018, (8p).

Sony, "Channel access for NR unlicensed operations", 3GPP TSG RAN WG1 Meeting #96bis, R1-1906834, Reno, USA, May 13-17, 2019, (5p).

CNOA issued in Application No. 202080001114.1 dated May 20, 2025 with English translation, (11p).

Status Report to TSG, "Study on NR-based Access to Unlicensed Spectrum", 750045, 3GPP TSG RAN meeting #82, RP-182397, Sorrento, Italy, Dec. 10-13, 2018, 9.3.5, (19p).

Status Report to TSG, "NR-based Access to Unlicensed Spectrum", 820067, 3GPP TSG RAN meeting #86, RP-192773, Sitges, Spain, Dec. 9-12, 2019, 9.4.3, (57p).

* cited by examiner

METHOD FOR TRANSMITTING DOWNLINK DATA ON PHYSICAL DOWNLINK SHARED CHANNEL (PDSCH) RESOURCE ACCORDING TO OCCUPANCY SIGNAL

CROSS-REFERENCE TO RELATED APPLICATION

The present application is the U.S. National phase application of International Application No. PCT/CN2020/092938, filed on May 28, 2020, the entire content of which is incorporated herein by reference for all purposes.

TECHNICAL FIELD

The present application relates to the field of wireless communication technology, but is not limited to the field of wireless communication technology, and in particular relates to methods and apparatuses for transmitting information, and communication devices.

BACKGROUND

In unlicensed frequency spectrum, e.g., New Radio-Unlicensed (NR-U) frequency spectrum, before sending data, the sending end may usually perform a Clear Channel Assessment (CCA), which is used to assess the interference level in the channel. If the interference is lower than the energy detection threshold, the sending end will consider that the channel is idle and the sending end can occupy the channel to send data. If the interference level is higher than the detection threshold, the sending end will consider that the channel is busy and the sending end may not be able to occupy the channel to send data. This is a Listen Before Talk (LBT) channel access mechanism.

However, LBT cannot solve the hidden node problem in unlicensed frequency spectrum communication. As shown in FIG. 1, TX1 will send data to RX1 and will perform CCA before sending, while TX2 is sending data to RX2 and the signal sent by TX2 will interfere with the reception of RX1. Since TX1 is far away from TX2, the interference from TX2 will not be detected during CCA, and TX1 will occupy the channel to send data to RX1. In this case, the data reception of RX1 is subject to strong interference from TX2, and therefore, TX2 is a hidden node for TX1.

SUMMARY

In view of above, methods and apparatuses for transmitting information, and communication devices are provided in examples of the present disclosure.

According to a first aspect of the present disclosure, there is provided a method for transmitting information, applied to a User Equipment (UE), the method including: sending an occupancy signal in response to a downlink control information (DCI) sent by a base station to the UE for scheduling a physical downlink shared channel (PDSCH) resource in an unlicensed frequency spectrum being detected in a physical downlink control channel (PDCCH) resource of the unlicensed frequency spectrum, where the occupancy signal is used to indicate that a channel of the PDSCH resource is to be occupied.

According to a second aspect of the present disclosure, there is provided a method for transmitting information, applied to a base station, the method including: sending to user equipment (UE) a downlink control information (DCI) for scheduling a physical downlink shared channel (PDSCH) resource in an unlicensed frequency spectrum using a physical downlink control channel (PDCCH) resource of the unlicensed frequency spectrum; receiving an occupancy signal sent by the UE in response to the DCI, wherein the occupancy signal is used to indicate that a channel corresponding to the PDSCH resource is to be occupied; and transmitting downlink data on the PDSCH resource according to the occupancy signal.

It should be understood that the foregoing general description and the following detailed descriptions are exemplary and explanatory only and do not limit the embodiments of the present disclosure.

BRIEF DESCRIPTION OF THE DRAWINGS

The accompanying drawings herein, which are incorporated into and constitute a part of this specification, illustrate embodiments consistent with the present application, and are used in conjunction with the specification to explain the principles of the embodiments of the present application.

DETAILED DESCRIPTION

Exemplary embodiments will be described herein in detail, examples of which are shown in the accompanying drawings. When the following description relates to the accompanying drawings, the same numerals in the different accompanying drawings indicate the same or similar elements unless otherwise indicated. The implementations described in the following exemplary embodiments do not represent all implementations that are consistent with embodiments of the present application. Rather, they are only examples of devices and methods that are consistent with some aspects of embodiments of the present application as detailed in the appended claims.

The terms used in the embodiments of the present disclosure are intended solely for the purpose of describing particular embodiments and are not intended to limit the embodiments of the present disclosure. The singular forms of "a", "the" and "this" as used in the embodiments of the present disclosure and the appended claims are also intended to include plural forms, unless the context clearly indicates other meanings. It should also be understood that the term "and/or" as used herein refers to and encompasses any or all possible combinations of one or more of the associated listed items.

It should be understood that while the terms "first", "second", "third", etc. may be employed in the embodiments of the present disclosure to describe various kinds of information, such information should not be limited to these terms. These terms are used only to distinguish the same type of information from one another. For example, without departing from the scope of embodiments of the present disclosure, first information may also be referred to as second information, and similarly, second information may also be referred to as first information, depending on the context. For example, the word "if" as used herein may be interpreted as "at that time" or "when . . . " or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
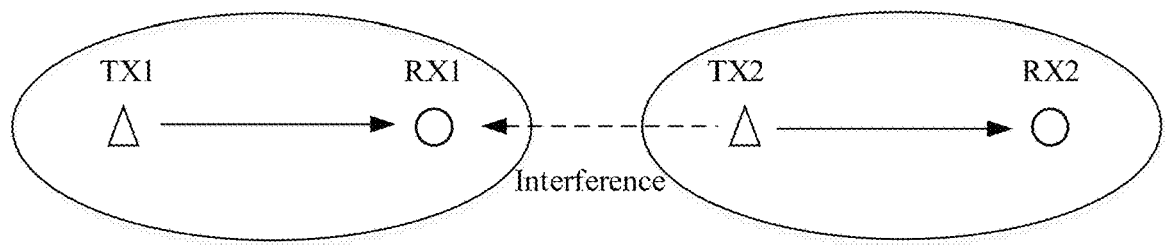
FIG. 1 is a schematic diagram of interference between communication systems illustrated in accordance with one or more examples of the present disclosure.
Figure 2:
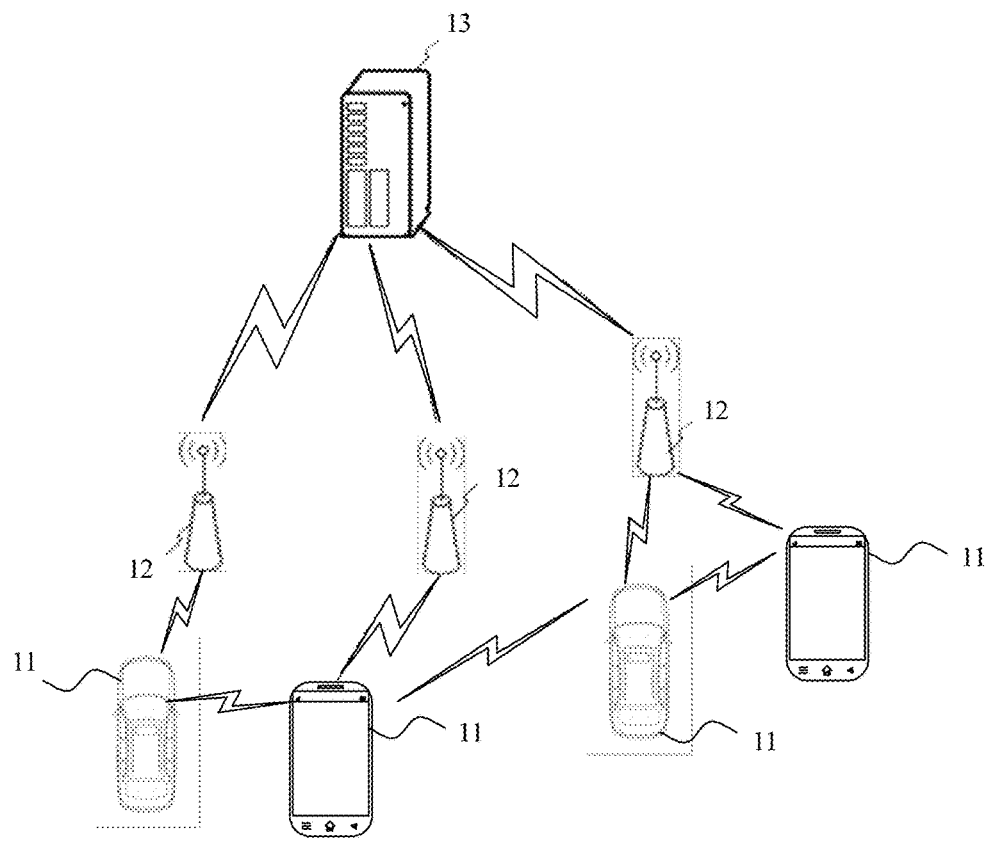
FIG. 2 is a schematic diagram of a structure of a wireless communication system illustrated in accordance with one or more examples of the present disclosure.

Referring to FIG. 2, it illustrates a schematic diagram of a structure of a wireless communication system provided by the examples of the present disclosure. As shown in FIG. 2, the wireless communication system is a communication system based on cellular mobile communication technology, and the wireless communication system may include: a plurality of terminals 11 and a plurality of base stations 12.

Here, terminal 11 may be a device that provides voice and/or data connectivity to a user. Terminal 11 may communicate with one or more core networks via a Radio Access Network (RAN). Terminal 11 may be an Internet of Things (IoT) terminal, such as a sensor device, a mobile phone (or "cellular" phone), and a computer with an IoT terminal, e.g., it may be a stationary device, a portable device, a pocket-sized device, a handheld device, a computer-built device, or a vehicle-mounted device. For example, it may be a station (STA), subscriber unit, subscriber station, mobile station, mobile, remote station, access point, remote terminal, access terminal, user terminal, user agent, user device, or user equipment (UE). Alternatively, terminal 11 may be a device of an unmanned aerial vehicle. Alternatively, terminal 11 may be on-board equipment, for example, an electronic control unit (ECU) with wireless communication function, or a wireless communication device with external ECU. Alternatively, terminal 11 can also be a roadside device, for example, a street light, a signal light, or other roadside devices with wireless communication function, etc.

Base station 12 may be a network side device in the wireless communication system. The wireless communication system may be the 4th generation mobile communication (4G) system, also known as a Long Term Evolution (LTE) system, or the wireless communication system may be a 5G system, also known as a new radio (NR) system or 5G NR system. Alternatively, the wireless communication system may be a further next generation system of the 5G system. The access network in the 5G system can be called New Generation-Radio Access Network (NG-RAN). Alternatively, it may be the MTC system.

Base station 12 may be an evolved base station (eNB) employed in the 4G system. Alternatively, base station 12 may be a base station (gNB) with a centralized distributed architecture employed in the 5G system. When base station 12 adopts a centralized distributed architecture, it usually includes a central unit (CU) and at least two distributed units (DU). The central unit is equipped with the protocol stack of Packet Data Convergence Protocol (PDCP) layer, Radio Link Control (RLC) layer, and Media Access Control (MAC) layer. The distributed unit is equipped with the physical (PHY) layer protocol stack. The specific implementations of base station 12 are not limited by this disclosure.

A wireless connection can be established between base station 12 and terminal 11 via a wireless air interface. In different implementations, the wireless air interface is based on the fourth generation mobile communication network technology (4G) standard, or the wireless air interface is based on the fifth generation mobile communication network technology (5G) standard, for example, the wireless air interface is New Radio, or, the wireless air interface may also be based on the next generation mobile communication network technology standard of 5G.

In some examples, End to End (E2E) connections can also be established between terminals 11, for example, in the scenarios such as a vehicle to vehicle (V2V) communication, vehicle to infrastructure (V2I) communication, and vehicle to pedestrian (V2P) communication of vehicle to everything (V2X) communication.

In some examples, the above wireless communication system may also include a network management device 13.

A number of base stations 12 are each connected to the network management device 13. The network management device 13 may be a core network device in the wireless communication system, for example, the network management device 13 may be a Mobility Management Entity (MME) in an Evolved Packet Core (EPC) network. Alternatively, the network management device may be another core network device, such as a Serving GateWay (SGW), Public Data Network GateWay (PGW), Policy and Charging Rules Function (PCRF), or Home Subscriber Server (HSS), etc. The implementation form of the network management device 13 is not limited by the examples of the present disclosure.

The implementation subject involved in the present disclosure includes, but is not limited to, user equipment (UE) such as a terminal supporting NR-U, and a base station of a cellular mobile communication, etc.

Figure 3:
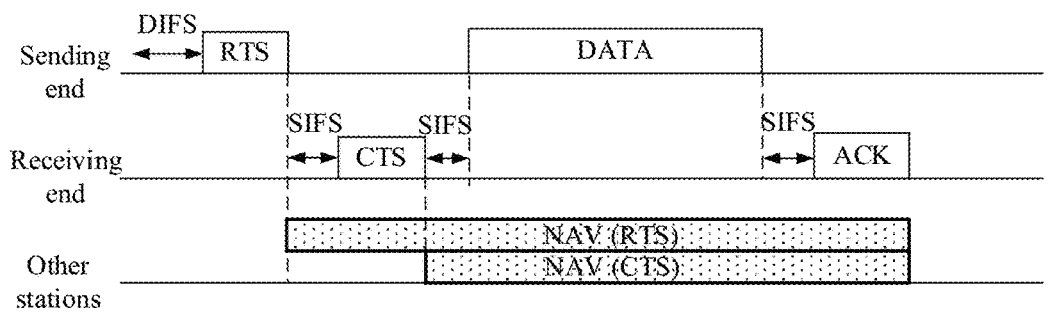
FIG. 3 is a schematic diagram of a listening and backoff timing sequence illustrated in accordance with one or more examples of the present disclosure.
Figure 4A:
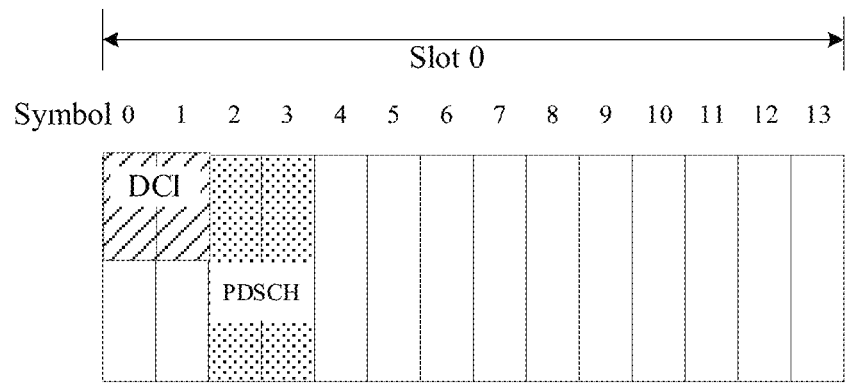
FIG. 4a is a schematic diagram of a relationship between PDCCH resources and PDSCH resources in the time domain illustrated in accordance with one or more examples of the present disclosure.
Figure 4B:
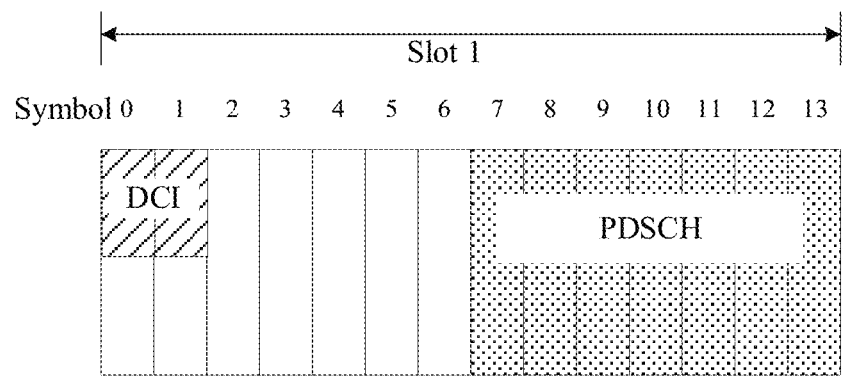
FIG. 4b is a schematic diagram of another relationship between PDCCH resources and PDSCH resources in the time domain illustrated in accordance with one or more examples of the present disclosure.
Figure 4C:
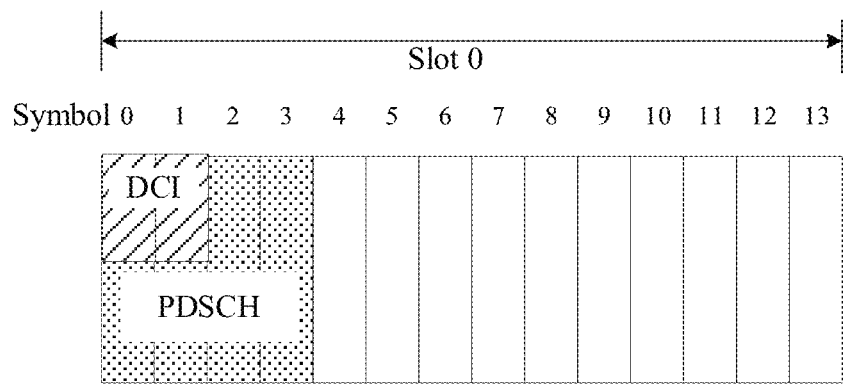
FIG. 4c is a schematic diagram of yet another relationship between PDCCH resources and PDSCH resources in the time domain illustrated in accordance with one or more examples of the present disclosure.
Figure 4D:
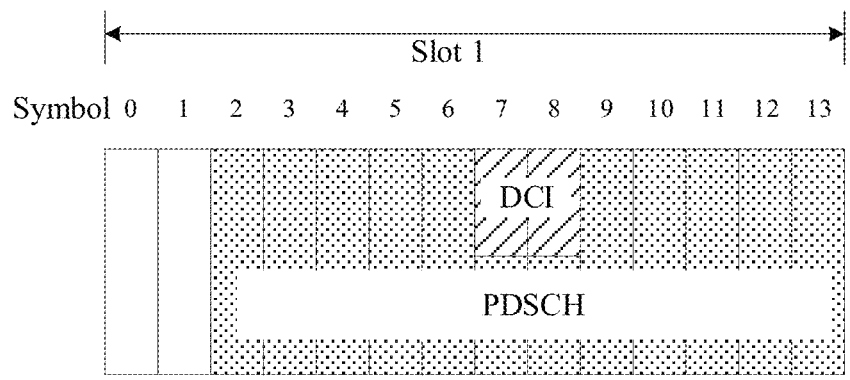
FIG. 4d is a schematic diagram of yet another relationship between PDCCH resources and PDSCH resources in the time domain illustrated in accordance with one or more examples of the present disclosure.

The examples of the present disclosure are applied to a Request To Send (RTS)/Clear To Send (CTS) mechanism to solve the hidden node problem. The handshake between the sending end and the receiving end is achieved by exchanging RTS frames and CTS frames, and the time fields contained in the RTS frames and CTS frames are used to clear the channels around the sending end and the receiving end before completing the data transmission and the corresponding feedback. As shown in FIG. 3, the sending end, after listening to that the channel is idle at the carrier and backing off for a time of Distributed Coordination Function Inter Frame Space (DIFS), sends a RTS frame to the receiving end. The nodes around the sending end that listen to the RTS frame back off according to the Network Allocation Vector (NAV) time indicated by the RTS frame, where the NAV time in the RTS frame includes the overall time required for the subsequent sending and feedback process. After receiving the RTS frame, the receiving end feeds back a CTS frame to the sending end after a Short Inter Frame space (SIFS) of 16 us, and the other nodes listening to the CTS frame back off according to an indicated NAV time, where the NAV time in the CTS frame contains the time from the end of sending the CTS frame to the completion of the data transmission and the corresponding acknowledgement (ACK) feedback.

In another way, a new air interface signal can be introduced, i.e., Channel Usage Indication (CUI) signal, which acts as the RTS/CTS signal described above. After the sending end occupies the channel in the LBT process, it sends a Channel Usage Indication for Transmission (CUI-T) signal to the receiving end to indicate that it will occupy the channel as a transmitter in the subsequent data transmission process. After receiving the CUI-T signal, the receiving end sends a Channel Usage Indication for Reception (CUI-R) signal to indicate that it will occupy the channel as a receiver in the subsequent data transmission process. If other surrounding nodes that will send data listen to the CUI-T signal, they will not back off. If other surrounding nodes that will send data listen to the CUI-R signal, they will back off.

In the New Radio (NR) system of the 5th Generation (5G) cellular mobile communication system, the base station schedules downlink data transmission for a UE in such a way that the base station adopts the PDCCH resources to transmit the DCI for scheduling the UE. As shown in FIGS. 4a to 4d, the PDSCH resources scheduled by the DCI can have a certain time interval with the PDCCH resources, or the PDSCH resources can be adjacent to the PDCCH resources, or the PDSCH resources can have the same starting position as the PDCCH resources, or the PDSCH resources can even be earlier than the starting position of the PDCCH resources. The UE will always keep the downlink monitoring state. The UE will first try to blindly detect the DCI, and after correctly demodulating to its own DCI, the UE will receive and demodulate the corresponding PDSCH downlink data according to the scheduling PSDCH resource position, modulation mode and beam indication, etc. indicated in the DCI.

When sending downlink data PDSCH over unlicensed frequency spectrum, the hidden node problem can be avoided if a mechanism like RTS/CTS is introduced. However, if the RTS/CTS mechanism is introduced, a large overhead is incurred because for each downlink transmission, the receiving and sending ends need to send RTS/CTS back and forth.

Figure 5:
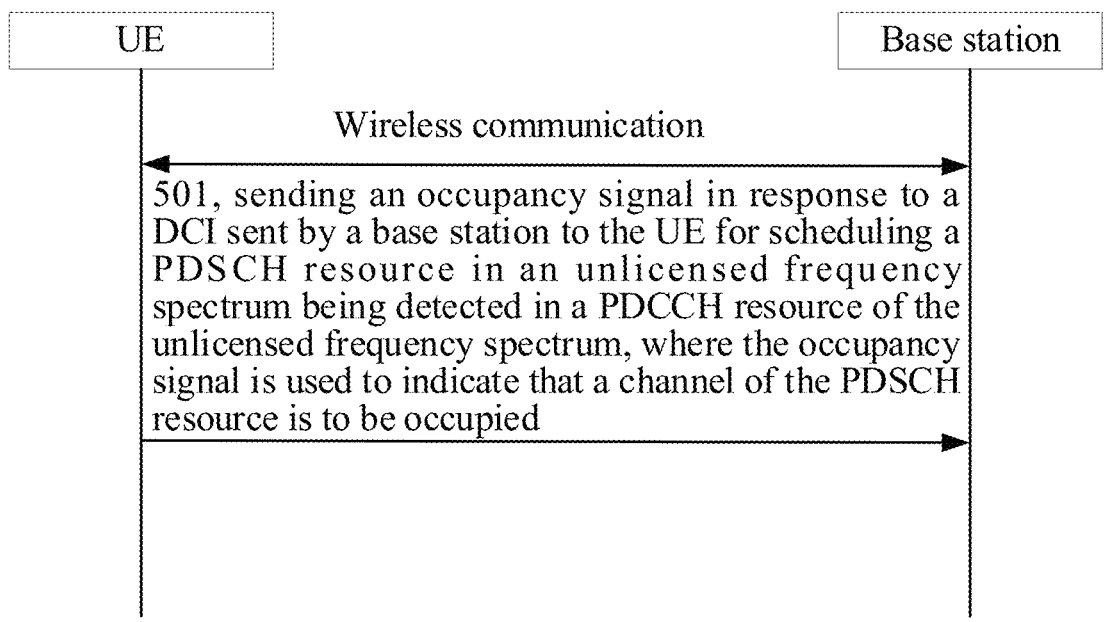
FIG. 5 is a flow diagram of a method for transmitting information illustrated in accordance with one or more examples of the present disclosure.

As shown in FIG. 5, this example provides a method for transmitting information, which is applied to UE as a terminal of a communication system. The method for transmitting information may include as follows.

Step 501, sending an occupancy signal in response to a DCI sent by a base station to the UE for scheduling a PDSCH resource in an unlicensed frequency spectrum being detected in a PDCCH resource of the unlicensed frequency spectrum.

The occupancy signal is used to indicate that a channel of the PDSCH resource is to be occupied.

Here, the communication system may be a cellular mobile communication system, and the communication system may achieve data transmission using unlicensed frequency spectrum. The communication system can be called the local communication system, and an external communication system may also exist on the unlicensed frequency spectrum. The external communication system may be a cellular mobile communication system or other type of communication system different from the local communication system. The external communication system and the local communication system share the unlicensed frequency spectrum. For example, the local communication system and the external communication system may be cellular mobile communication systems of different operators, or, the external communication system may be a Wi-Fi communication system, etc.

When the base station or the UE uses the unlicensed frequency spectrum, the LBT frequency band is used as the occupied frequency band unit for occupation. The LBT frequency band may be 20 MHz.

In the unlicensed frequency band, the base station transmits the DCI using the PDCCH resource, and the PDCCH resource can occupy one or more LBT frequency bands. Before transmitting the DCI, the base station may perform CCA for one or more LBT frequency bands occupied by the PDCCH resource. When one or more LBT frequency bands occupied by the PDCCH resource are detected to be idle, the DCI is sent using the PDCCH resource.

The UE can perform blind DCI detection on the PDCCH. If the DCI sent to the UE for scheduling the PDSCH resource is detected, the UE needs to receive downlink data sent by the base station through the PDSCH resource.

The UE can send the occupancy signal. The occupancy signal may indicate to a communication node such as an external communication device in the external communication system that the channel corresponding to the PDSCH resource is to be occupied. The external communication device within the signal coverage of the UE may determine based on the occupancy signal that the channel corresponding to the PDSCH resource is occupied, and thus silence on the channel corresponding to the PDSCH resource.

The occupancy signal may carry occupancy information to indicate an occupied channel. Alternatively, the external device may measure the occupancy signal and determine whether a channel is occupied based on the results of the measurement. For example, if the signal strength of the occupancy signal is greater than an intensity threshold, it is considered that the channel is occupied.

For the case where the occupancy signal carries occupancy information to indicate the occupied channel, the UE may broadcast the occupancy signal. The external device may determine that the channel is occupied based on the received occupancy signal.

For the case where the external device determines whether a channel is occupied via signal measurement, the UE can send an occupancy signal to the base station. The occupancy signal can simultaneously indicate to the base station that the channel is available for use and for other devices to perform CCA.

In this way, the UE sends the occupancy signal, so that communication nodes such as external devices that detect the occupancy signal within the signal coverage area of the UE avoid the downlink transmission of the base station. The situation where the downlink transmission is interfered by the hidden node due to the base station's inability to detect the hidden node is reduced, the downlink transmission reliability is improved, and the communication quality is enhanced.

In one example, there is a time interval between the PDCCH resource and the PDSCH resource, where the PDCCH resource is located before the PDSCH resource in a time domain.

Step 501 may include: sending the occupancy signal within a time window in the time interval.

A time interval needs to be provided between the PDCCH resource carrying the DCI and the PDSCH resource scheduled by the DCI to enable the UE to demodulate the DCI in the PDCCH resource and send the occupancy signal during the time interval.

In other examples, the time window can be within the time interval. The UE can send the occupancy signal within the time window.

The base station can receive the occupancy signal during the time window.

A minimum value of the time interval can be determined based on a first minimum length of time required for the UE to blindly detect and decode the DCI, and a second maximum length of time to send the occupancy signal. The minimum value of the time interval may be greater than or equal to the sum of the first minimum length and the second minimum length. The time window may be greater than or equal to the second minimum length.

By setting the time interval and time window, it provides time guarantee for the UE to determine the PDSCH resource, which in turn enables the occupancy signal sent by the UE to indicate that the PDSCH resource is occupied, improving the accuracy of the occupancy signal indication.

Exemplarily, the minimum value of the time interval can be N symbols. That is, the PDSCH resources should be scheduled after N symbols of the end position of the PDCCH resources. When the base station indicates the time domain position of the scheduled PDSCH resources in the DCI, it needs to ensure that the starting time domain position of the scheduled PDSCH resources is after N symbols of the end position of the PDCCH resources. The value of N can be any positive integer, for example, the value of N can be 2, 3 or 4, etc.

In one example, the method for transmitting information may further include: obtaining a minimum value of the time interval and/or the time window specified by a communication protocol or indicated by the base station.

The minimum value and/or time window of the time interval can be specified by the communication protocol.

The minimum value and/or time window of the time interval can also be indicated by the base station via downlink signaling. For example, the base station can configure the minimum value of the time interval and/or the time window via RRC layer signaling.

The minimum value of the time interval can be configured by the RRC or specified by the communication protocol. The time interval between the DCI and the PDSCH can be greater than or equal to this minimum value when the PDSCH is scheduled by the DCI.

In one example, the sending the occupancy signal within a time window in the time interval includes one of: sending the occupancy signal within a first number of symbols after the PDCCH resource; and sending the occupancy signal within a second number of symbols before the PDSCH resource.

Figure 6A:
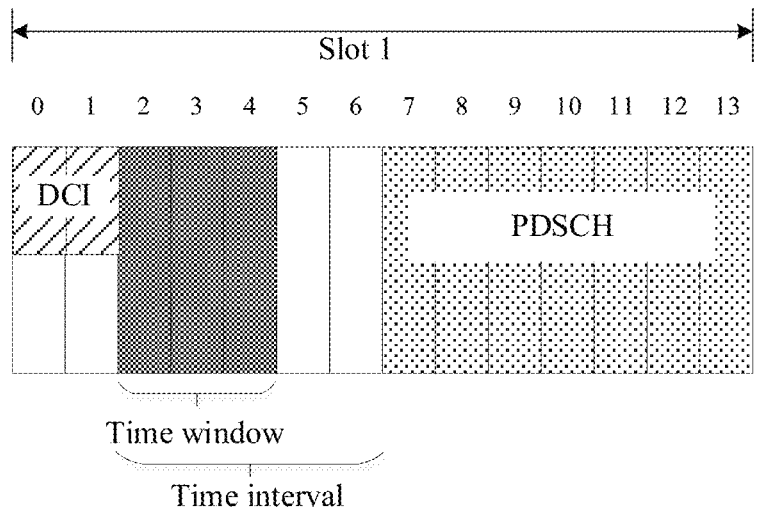
FIG. 6a is a schematic diagram of positions of a time interval and a time window illustrated in accordance with one or more examples of the present disclosure.
Figure 6B:
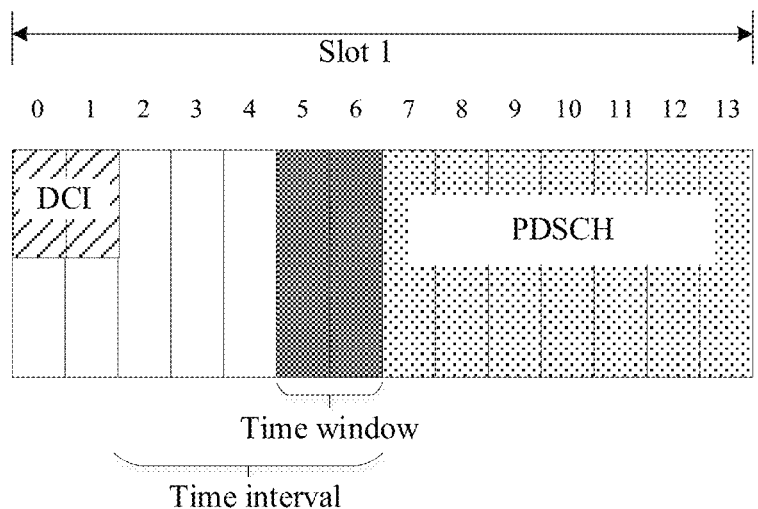
FIG. 6b is another schematic diagram of positions of a time interval and a time window illustrated in accordance with one or more examples of the present disclosure.

Exemplarily, as shown in FIG. 6b, the time window for the UE to send the occupancy signal can be agreed by protocol to be within 2 time domain symbols before the starting time domain position of the PDSCH. As shown in FIG. 6a, the time window for the UE to send the occupancy signal can also be configured via RRC layer signaling to be within 3 time domain symbols after the end position of the PDCCH.

Exemplarily, if CCA is not performed for the channel of the PDSCH resource, the occupancy signal can be sent within the first number of symbols after the PDCCH resource. In this way, the channel of the PDSCH resource can be occupied immediately, and the timeliness of the channel occupation of the PDSCH resource can be improved.

If CCA is required for the channel of the PDSCH resource, the occupancy signal can be sent within the second number of symbols before the PDSCH resource. In this way, time is reserved for CCA after the PDCCH resource.

In one example, step 501 may include: sending the occupancy signal in a listen before talk (LBT) frequency band to which the PDSCH resource belongs.

When the base station or the UE uses the unlicensed frequency spectrum, the LBT frequency band is used as the occupied frequency band unit for occupation. The LBT frequency band may be 20 MHz.

In the unlicensed frequency band, the base station performs the downlink transmission using the PDSCH resource, and the PDSCH resource can occupy one or more LBT frequency bands.

The UE can send the occupancy signal on one or more LBT frequency bands occupied by the PDSCH resource, such that the occupancy signal can cover the LBT frequency bands to be occupied by the PDSCH resource.

Exemplarily, in the frequency band of 5 GHz, the LBT frequency band is 20 MHz. After receiving the DCI, the UE can know the time domain and frequency domain position of the PDSCH resource by demodulating the DCI. The frequency domain position of the PDSCH resource may be in only one LBT frequency band or may cross multiple LBT frequency bands. The position of the LBT frequency band where the occupancy signal is located should be the same as the position of the LBT frequency where the PDSCH is located. For example, the UE determines that the frequency domain position of the PDSCH resource is on LBT frequency band 0 and LBT frequency band 1 by demodulating the DCI, and then, the UE can send the occupancy signal on both LBT frequency band 0 and LBT frequency band 1.

In this way, the occupancy signal is sent in the LBT frequency band to which the PDSCH resource belongs, causing the communication nodes within the signal coverage area of the UE to avoid the LBT frequency band to which the PDSCH resource of the base station belongs. It reduces the situation of hidden node interference in the LBT frequency band to which the PDSCH resource belongs due to the inability of the base station to detect the hidden node, improves the downlink transmission reliability and enhances the communication quality.

In one example, the sending the occupancy signal in a LBT frequency band to which the PDSCH resource belongs includes one of: sending the occupancy signal using one or more interleaved resource blocks in the LBT frequency band, the one or more interleaved resource blocks including one or more resource blocks (RBs); and sending the occupancy signal using one or more RBs in the LBT frequency band.

Here, the LBT frequency band to which the PDSCH resource belongs includes one or more LBT frequency bands.

The LBT frequency band can be divided into a plurality of RBs, and the plurality of RBs are allocated to a plurality of interleaved resource blocks. The plurality of interleaved resource blocks include one or more RBs, each interleaved resource block is different, and the plurality of interleaved resource blocks occupy the entire LBT frequency band in the form of combs.

For example, in an interleaved resource allocation method, a LBT frequency band of 20 MHZ can be divided into 10 or 5 interleaved resource blocks in the form of combs. When it is divided into 10 interleaved resource blocks, the subcarrier bandwidth is 15 KHz, while when it is divided into 5 interleaved resource blocks, the subcarrier bandwidth is 30 KHz.

For example, at 15 KHz subcarrier, the LBT frequency band of 20 MHz contains 106 RBs with indexes ranging from 0 to 105. The 106 RBs can be divided into 10 interleaved resource blocks with indexes ranging from 0 to 9, and each interleaved resource block contains 10 or 11 RBs. For example, interleaved resource block 0 contains RB 0, RB 10, RB 20, RB 30, RB 40, RB 50, RB 60, RB 70, RB 80, RB 90 and RB 100, 11 in total; and interleaved resource block 6 contains RB 6, RB 16, RB 26, RB 36, RB 46, RB 56, RB 66, RB 76, RB 86, and RB 96, 10 in total. Each interleaved resource block occupies the entire LBT frequency band in the form of combs.

The UE can send the occupancy signal using one or more interleaved resource blocks, and the base station can receive the occupancy signal using one or more interleaved resource blocks. Here, the UE can send the occupancy signal using the interleaved resource blocks with the same sequence number on a plurality of LBT frequency bands.

Exemplarily, the base station can semi-statically allocate a certain interleaved resource block to the UE as a frequency domain resource for sending the occupancy signal in a certain LBT frequency band. For example, the base station allocates an interleaved resource block 3 to the UE as a frequency domain resource for sending the occupancy signal, and when the occupancy signal needs to be sent on both LBT frequency band 0 and LBT frequency band 1, the UE will send the occupancy signal on both the interleaved resource block 3 in LBT frequency band 0 and the interleaved resource block 3 in LBT frequency band 1.

External devices, etc., can determine the occupation of the LBT frequency band according to the sending of the occupancy signal on one or more interleaved resource blocks.

In this way, the interleaved resource block is used to send the occupancy signal, which, on the one hand, improves the coverage rate of the occupancy signal in the LBT frequency band, and thereby improving the detectability of the occupancy signal and the detection efficiency of the occupancy signal, and on the other hand, can meet the regulatory requirement of sending data in unlicensed frequency band, i.e., the signal sent by the sending end is required to occupy a predetermined proportion of the communication channel, such as 80% of the communication channel.

The UE can also send the occupancy signal using a segment of continuous frequency resources. For example, the UE can send the occupancy signal using a continuous number of RBs on the LBT frequency band. The RBs used to send the occupancy signal can be configured by the base station, e.g., configured by RRC signaling.

Exemplarily, the base station allocates the $10^{th}$ to $11^{th}$ RBs to the UE for sending the occupancy signal, and when the occupancy signal needs to be sent on both LBT frequency band 0 and LBT frequency band 1, the UE will send the occupancy signal on the $10^{th}$ to $11^{th}$ RBs in LBT frequency band 0 and the $10^{th}$ to $11^{th}$ RBs in LBT frequency band 1.

In one example, the occupancy signal is used to indicate that the LBT frequency band is to be occupied.

The occupancy signal that is sent in the LBT frequency band to which the PDSCH resource belongs can indicate that the LBT frequency band to which the PDSCH resource belongs is occupied.

The occupancy signal can carry occupancy information to indicate the occupied channel. Alternatively, the occupancy signal can indicate the occupied channel using a signal code. Alternatively, the external device can measure the occupancy signal and determine whether the channel is occupied based on the results of the measurement.

Exemplarily, the external device detects that an occupancy signal is detected on LBT frequency band 0, and if the signal strength of the occupancy signal is greater than the intensity threshold, it is considered that the LBT frequency band 0 is occupied.

In one example, step 501 may include: performing a clear channel assessment for the LBT frequency band to which the PDSCH resource belongs; and sending the occupancy signal in response to the LBT frequency band being idle.

The UE may or may not perform CCA on the channel before sending the occupancy signal.

The UE may perform CCA on the channel before sending the occupancy signal. If it is detected that the interference from other signals in the channel is less than the threshold value, the UE will send the occupancy signal. If the UE performs CCA, the base station transmits downlink data using the PDSCH resource only after receiving the occupancy signal from the UE, otherwise it will not transmit the downlink data.

In this way, performing the clear channel assessment and sending the occupancy signal after determining that the channel is idle, can reduce the mutual interference generated by the sent occupancy signal and the signals currently sent by other communication devices in the LBT frequency band to which the PDSCH resource belongs. Thus, the data transmission can be performed when the interference on PDSCH resources is ensured to be within an acceptable range, thereby improving the transmission quality of the downlink data.

In one example, the occupancy signal is also used to indicate that the base station is allowed to transmit downlink data using the PDSCH resource.

The occupancy signal may be a Clear To Send (CTS) signal sent to the base station in response to a DCI. The occupancy signal can indicate that the base station is allowed to transmit downlink data using the PDSCH resource, and inform devices other than the base station that the channel corresponding to the PDSCH resource is occupied.

After the base station receives the occupancy signal, it can transmit the downlink data using the PDSCH resource indicated by DCI.

In one example, step 501 may include: sending the occupancy signal carrying identification information of the UE, where the identification information of the UE is used to determine by the base station the UE that sends the occupancy signal.

The occupancy signal sent by the UE can carry the identification information of this UE and is used by the base station to determine from which UE the received occupancy signal is sent.

After determining the UE according to the identification information, the base station transmits the downlink data to the UE by using PDSCH resources.

By setting the identification information, the base station can identify the UE that sends the occupancy signal and send the downlink data belonging to the UE to the UE, which reduces the situation that downlink data is sent to the wrong UE.

Figure 7:
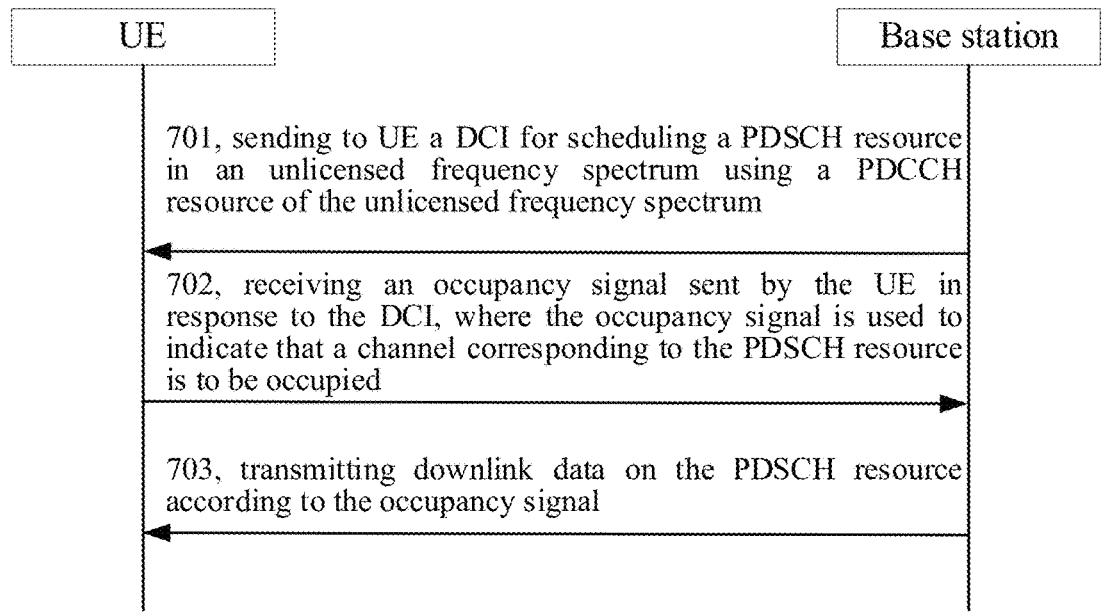
FIG. 7 is a flow diagram of another method for transmitting information illustrated in accordance with one or more examples of the present disclosure.

As shown in FIG. 7, this example provides a method for transmitting information, which is applied to a base station of a communication system. The method for transmitting information may include as follows.

Step 701, sending to UE a DCI for scheduling a PDSCH resource in an unlicensed frequency spectrum using a PDCCH resource of the unlicensed frequency spectrum.

Step 702, receiving an occupancy signal sent by the UE in response to the DCI, where the occupancy signal is used to indicate that a channel corresponding to the PDSCH resource is to be occupied.

Step 703, transmitting downlink data on the PDSCH resource according to the occupancy signal.

Here, the communication system may be a cellular mobile communication system, and the communication system may achieve data transmission using unlicensed frequency spectrum. The communication system can be called the local communication system, and an external communication system may also exist on the unlicensed frequency spectrum. The external communication system may be a cellular mobile communication system or other type of communication system different from the local communication system. The external communication system and the local communication system share the unlicensed frequency spectrum. For example, the local communication system and the external communication system may be cellular mobile communication systems of different operators, or, the external communication system may be a Wi-Fi communication system, etc.

When the base station or the UE uses the unlicensed frequency spectrum, the LBT frequency band is used as the occupied frequency band unit for occupation. The LBT frequency band may be 20 MHz.

In the unlicensed frequency band, the base station sends the DCI using the PDCCH resource, and the PDCCH resource can occupy one or more LBT frequency bands. Before sending the DCI, the base station may perform CCA for one or more LBT frequency bands occupied by the PDCCH resource. When one or more LBT frequency bands occupied by the PDCCH resource are detected to be idle, the DCI is sent using the PDCCH resource.

The UE can perform blind DCI detection on the PDCCH. If the DCI sent to the UE for scheduling the PDSCH resource is detected, the UE needs to receive downlink data sent by the base station through the PDSCH resource.

The occupancy signal may be a Clear To Send (CTS) signal sent to the base station in response to a DCI. The occupancy signal can indicate that the base station is allowed to transmit downlink data using the PDSCH resource, and inform devices other than the base station that the channel corresponding to the PDSCH resource is occupied.

After the base station receives the occupancy signal, it can transmit the downlink data using the PDSCH resource indicated by DCI.

The UE can send the occupancy signal. The occupancy signal may indicate to a communication node such as an external communication device in the external communication system that the channel corresponding to the PDSCH resource is to be occupied. The external communication device within the signal coverage of the UE may determine based on the occupancy signal that the channel corresponding to the PDSCH resource is occupied, and thus silence on the channel corresponding to the PDSCH resource.

The occupancy signal may carry occupancy information to indicate an occupied channel. Alternatively, the external device may measure the occupancy signal and determine whether a channel is occupied based on the results of the measurement. For example, if the signal strength of the occupancy signal is greater than an intensity threshold, it is considered that the channel is occupied.

For the case where the occupancy signal carries occupancy information to indicate the occupied channel, the UE may broadcast the occupancy signal. The external device may determine that the channel is occupied based on the received occupancy signal.

For the case where the external device determines whether a channel is occupied via signal measurement, the UE can send an occupancy signal to the base station. The occupancy signal can simultaneously indicate to the base station that the channel is available for use and for other devices to perform CCA.

In this way, the UE sends the occupancy signal, so that communication nodes such as external devices that detect the occupancy signal within the signal coverage area of the UE avoid the downlink transmission of the base station. The situation where the downlink transmission is interfered by the hidden node due to the base station's inability to detect the hidden node is reduced, the downlink transmission reliability is improved, and the communication quality is enhanced.

In one example, there is a time interval between the PDCCH resource and the PDSCH resource, where the PDCCH resource is located before the PDSCH resource in a time domain.

Step 702 may include: receiving the occupancy signal within a time window in the time interval.

A time interval needs to be provided between the PDCCH resource carrying the DCI and the PDSCH resource scheduled by the DCI to enable the UE to demodulate the DCI in the PDCCH resource and send the occupancy signal during the time interval.

In other examples, the time window can be within the time interval. The UE can send the occupancy signal within the time window.

The base station can receive the occupancy signal during the time window.

A minimum value of the time interval can be determined based on a first minimum length of time required for the UE to blindly detect and decode the DCI, and a second maximum length of time to send the occupancy signal. The minimum value of the time interval may be greater than or equal to the sum of the first minimum length and the second minimum length. The time window may be greater than or equal to the second minimum length.

By setting the time interval and time window, it provides time guarantee for the UE to determine the PDSCH resource, which in turn enables the occupancy signal sent by the UE to indicate that the PDSCH resource is occupied, improving the accuracy of the occupancy signal indication.

Exemplarily, the minimum value of the time interval can be N symbols. That is, the PDSCH resources should be scheduled after N symbols of the end position of the PDCCH resources. When the base station indicates the time domain position of the scheduled PDSCH resources in the DCI, it needs to ensure that the starting time domain position of the scheduled PDSCH resources is after N symbols of the end position of the PDCCH resources. The value of N can be any positive integer, for example, the value of N can be 2, 3 or 4, etc.

In one example, the method for transmitting information may include at least one of: obtaining a minimum value of the time interval and/or the time window specified by a communication protocol; and indicating to the UE a minimum value of the time interval and/or the time window.

The minimum value and/or time window of the time interval can be specified by the communication protocol.

The minimum value and/or time window of the time interval can also be indicated by the base station via downlink signaling. For example, the base station can configure the minimum value of the time interval and/or the time window via RRC layer signaling.

The minimum value of the time interval can be configured by the RRC or specified by the communication protocol. The time interval between the DCI and the PDSCH can be greater than or equal to this minimum value when the PDSCH is scheduled by the DCI.

In one example, the receiving the occupancy signal within a time window in the time interval includes one of: receiving the occupancy signal within a first number of symbols after the PDCCH resource; and receiving the occupancy signal within a second number of symbols before the PDSCH resource.

Exemplarily, as shown in FIG. 6b, the time window for the UE to send CTS can be agreed by protocol to be within 2 time domain symbols before the starting time domain position of the PDSCH. As shown in FIG. 6a, the time window for the UE to send CTS can also be configured via RRC layer signaling to be within 3 time domain symbols after the end position of the PDCCH.

Exemplarily, if CCA is not performed for the channel of the PDSCH resource, the occupancy signal can be sent within the first number of symbols after the PDCCH resource. In this way, the channel of the PDSCH resource can be occupied immediately, and the timeliness of the channel occupation of the PDSCH resource can be improved.

If CCA is required for the channel of the PDSCH resource, the occupancy signal can be sent within the second number of symbols before the PDSCH resource. In this way, time is reserved for CCA after the PDCCH resource.

In one example, step 702 may include: receiving the occupancy signal in a listen before talk (LBT) frequency band to which the PDSCH resource belongs.

When the base station or the UE uses the unlicensed frequency spectrum, the LBT frequency band is used as the occupied frequency band unit for occupation. The LBT frequency band may be 20 MHz.

In the unlicensed frequency band, the base station performs the downlink transmission using the PDSCH resource, and the PDSCH resource can occupy one or more LBT frequency bands.

The UE can send the occupancy signal on one or more LBT frequency bands occupied by the PDSCH resource, such that the occupancy signal can cover the LBT frequency bands to be occupied by the PDSCH resource.

Exemplarily, in the frequency band of 5 GHz, the LBT frequency band is 20 MHz. After receiving the DCI, the UE can know the time domain and frequency domain position of the PDSCH resource by demodulating the DCI. The frequency domain position of the PDSCH resource may be in only one LBT frequency band or may cross multiple LBT frequency bands. The position of the LBT frequency band where the occupancy signal is located should be the same as the position of the LBT frequency where the PDSCH is located. For example, the UE determines that the frequency domain position of the PDSCH resource is on LBT frequency band 0 and LBT frequency band 1 by demodulating the DCI, and then, the UE can send the occupancy signal on both LBT frequency band 0 and LBT frequency band 1.

In this way, the occupancy signal is sent in the LBT frequency band to which the PDSCH resource belongs, causing the communication nodes within the signal coverage area of the UE to avoid the LBT frequency band to which the PDSCH resource of the base station belongs. It reduces the situation of hidden node interference in the LBT frequency band to which the PDSCH resource belongs due to the inability of the base station to detect the hidden node, improves the downlink transmission reliability and enhances the communication quality.

In one example, the receiving the occupancy signal in a LBT frequency band to which the PDSCH resource belongs includes one of: receiving the occupancy signal sent by the UE using one or more interleaved resource blocks in the LBT frequency band, the one or more interleaved resource blocks comprising one or more resource blocks (RBs); and receiving the occupancy signal sent by the UE using one or more RBs in the LBT frequency band.

Here, the LBT frequency band to which the PDSCH resource belongs includes one or more LBT frequency bands.

The LBT frequency band can be divided into a plurality of RBs, and the plurality of RBs are allocated to a plurality of interleaved resource blocks. The plurality of interleaved resource blocks include one or more RBs, each interleaved resource block is different, and the plurality of interleaved resource blocks occupy the entire LBT frequency band in the form of combs.

For example, in an interleaved resource allocation method, a LBT frequency band of 20 MHZ can be divided into 10 or 5 interleaved resource blocks in the form of combs. When it is divided into 10 interleaved resource blocks, the subcarrier bandwidth is 15 KHz, while when it is divided into 5 interleaved resource blocks, the subcarrier bandwidth is 30 KHz.

For example, at 15 KHz subcarrier, the LBT frequency band of 20 MHz contains 106 RBs with indexes ranging from 0 to 105. The 106 RBs can be divided into 10 interleaved resource blocks with indexes ranging from 0 to 9, and each interleaved resource block contains 10 or 11 RBs. For example, interleaved resource block 0 contains RB 0, RB 10, RB 20, RB 30, RB 40, RB 50, RB 60, RB 70, RB 80, RB 90 and RB 100, 11 in total; and interleaved resource block 6 contains RB 6, RB 16, RB 26, RB 36, RB 46, RB 56, RB 66, RB 76, RB 86, and RB 96, 10 in total. Each interleaved resource block occupies the entire LBT frequency band in the form of combs.

The UE can send the occupancy signal using one or more interleaved resource blocks, and the base station can receive the occupancy signal using one or more interleaved resource blocks. Here, the UE can send the occupancy signal using the interleaved resource blocks with the same sequence number on a plurality of LBT frequency bands.

Exemplarily, the base station can semi-statically allocate a certain interleaved resource block to the UE as a frequency domain resource for sending the occupancy signal in a certain LBT frequency band. For example, the base station allocates an interleaved resource block 3 to the UE as a frequency domain resource for sending the occupancy signal, and when the occupancy signal needs to be sent on both LBT frequency band 0 and LBT frequency band 1, the UE will send the occupancy signal on both the interleaved resource block 3 in LBT frequency band 0 and the interleaved resource block 3 in LBT frequency band 1.

External devices, etc., can determine the occupation of the LBT frequency band according to the sending of the occupancy signal on one or more interleaved resource blocks.

In this way, the interleaved resource block is used to send the occupancy signal, which, on the one hand, improves the coverage rate of the occupancy signal in the LBT frequency band, and thereby improving the detectability of the occupancy signal and the detection efficiency of the occupancy signal, and on the other hand, can meet the regulatory requirement of sending data in unlicensed frequency band, i.e., the signal sent by the sending end is required to occupy a predetermined proportion of the communication channel, such as 80% of the communication channel.

The UE can also send the occupancy signal using a segment of continuous frequency resources. For example, the UE can send the occupancy signal using a continuous number of RBs on the LBT frequency band. The RBs used to send the occupancy signal can be configured by the base station, e.g., configured by RRC signaling.

Exemplarily, the base station allocates the $10^{th}$ to $11^{th}$ RBs to the UE for sending the occupancy signal, and when the occupancy signal needs to be sent on both LBT frequency band 0 and LBT frequency band 1, the UE will send the occupancy signal on the $10^{th}$ to $11^{th}$ RBs in LBT frequency band 0 and the $10^{th}$ to $11^{th}$ RBs in LBT frequency band 1.

In one example, the occupancy signal is used to indicate that the LBT frequency band is to be occupied.

The occupancy signal that is sent in the LBT frequency band to which the PDSCH resource belongs can indicate that the LBT frequency band to which the PDSCH resource belongs is occupied.

The occupancy signal can carry occupancy information to indicate the occupied channel. Alternatively, the occupancy signal can indicate the occupied channel using a signal code. Alternatively, the external device can measure the occupancy signal and determine whether the channel is occupied based on the results of the measurement.

Exemplarily, the external device detects that an occupancy signal is detected on LBT frequency band 0, and if the signal strength of the occupancy signal is greater than the intensity threshold, it is considered that the LBT frequency band 0 is occupied.

In one example, the occupancy signal carries identification information, and the method for transmitting information includes: determining the UE that sends the occupancy signal according to the identification information.

The occupancy signal sent by the UE can carry the identification information of this UE and is used by the base station to determine from which UE the received occupancy signal is sent.

After determining the UE according to the identification information, the base station sends the downlink data to the UE by using PDSCH resources.

By setting the identification information, the base station can identify the UE that sends the occupancy signal and send the downlink data belonging to the UE to the UE, which reduces the situation that downlink data is sent to the wrong UE.

A specific example is provided below in conjunction with any of the above examples.

In the unlicensed frequency band, the UE can perform a blind DCI detection on the PDCCH. If a DCI sent to the UE for scheduling the PDSCH resource is detected, the UE will send an occupancy signal, e.g. sending a CTS signal to the base station. After receiving the CTS signal, the base station will send the downlink data through the PDSCH resource.

A minimum time interval is required between the PDCCH resource where the DCI is located and the scheduled PDSCH resource to enable the UE to perform PDCCH demodulation and CTS transmission within this interval. This minimum time interval can be configured by the RRC layer signaling of the base station or agreed directly in the protocol.

A time window for the UE to send CTS can also be defined, and the time window should be within the above-mentioned time interval. The UE should send the CTS within this time window and the base station should expect to receive the CTS signal within this time window. This time window for sending CTS can also be configured by the RRC or agreed by the protocol.

The UE may not perform CCA on the channel before sending CTS, and send CTS after receiving its own DCI. Alternatively, the UE may perform CCA on the channel before sending CTS, and send CTS only if the detected channel interference is less than the threshold value. In the second case, the base station will send PDSCH only after receiving the CTS signal from the UE, otherwise it will not send PDSCH.

The CTS signal sent by the UE can carry the identification of this UE, which is used by the base station to determine from which UE the received CTS signal is sent. Other neighboring nodes can listen to the CTS signal sent by this UE and thus back off.

For example, the minimum time interval between a PDCCH resource and a PDSCH resource is configured via RRC to be 4 time domain symbols. That is, the scheduling of the PDSCH resource should be 4 symbols after the end position of the PDCCH resource. When the base station indicates the time domain position of the scheduled PDSCH resource in the DCI, the starting time domain position of the scheduled PDSCH resource should be ensured to be 4 symbols after the end position of the PDCCH resource.

As shown in FIG. 6b, the time window for the UE to send CTS can be agreed by protocol to be within 2 time domain symbols before the starting time domain position of the PDSCH. As shown in FIG. 6a, the time window for the UE to send CTS can also be configured via RRC layer signaling to be within 3 time domain symbols after the end position of the PDCCH.

Frequency domain position of the CTS signal.

In the unlicensed frequency spectrum, channel monitoring is performed in units of the LBT frequency band, e.g., the LBT frequency band is 20 MHz in the frequency band of 5

GHz. After receiving the DCI, the UE can know the time domain and frequency domain position of the PDSCH resource by demodulating the DCI. The frequency domain position of the PDSCH resource may be in only one LBT frequency band or may cross multiple LBT frequency bands. The position of the LBT frequency band where the CTS is located should be the same as the position of the LBT frequency band where the PDSCH resource is located.

For example, the UE determines that the frequency domain position of the PDSCH resource is on LBT frequency band 0 and LBT frequency band 1 by demodulating the DCI, and then the UE should send the CTS signal on both LBT frequency band 0 and LBT frequency band 1.

The base station can semi-statically allocate a certain interleaved resource block to the UE as a frequency domain resource for sending CTS in a certain LBT frequency band. For example, the base station allocates interleaved resource block 3 to the UE as a frequency domain resource for sending CTS, and when the CTS signal needs to be sent on both LBT frequency band 0 and LBT frequency band 1, the UE will send the CTS signal on both the interleaved resource block 3 in LBT frequency band 0 and the interleaved resource block 3 in LBT frequency band 1.

In an interleaved resource allocation method, a LBT frequency band of 20 MHZ can be divided into 10 or 5 interleaved resource blocks in the form of combs. When it is divided into 10 interleaved resource blocks, the subcarrier bandwidth is 15 KHz, while when it is divided into 5 interleaved resource blocks, the subcarrier bandwidth is 30 KHz.

For example, at 15 KHz subcarrier, the LBT frequency band of 20 MHz contains 106 RBs with indexes ranging from 0 to 105. The 106 RBs can be divided into 10 interleaved resource blocks with indexes ranging from 0 to 9, and each interleaved resource block contains 10 or 11 RBs. For example, interleaved resource block 0 contains RB 0, RB 10, RB 20, RB 30, RB 40, RB 50, RB 60, RB 70, RB 80, RB 90 and RB 100, 11 in total; and interleaved resource block 6 contains RB 6, RB 16, RB 26, RB 36, RB 46, RB 56, RB 66, RB 76, RB 86, and RB 96, 10 in total. Each interleaved resource block occupies the entire LBT frequency band in the form of combs.

The UE can send the occupancy signal using one or more interleaved resource blocks, and the base station can receive the occupancy signal using one or more interleaved resource blocks. Here, the UE can send the occupancy signal using the interleaved resource blocks with the same sequence number on a plurality of LBT frequency bands.

Exemplarily, the base station can semi-statically allocate a certain interleaved resource block to the UE as a frequency domain resource for sending the occupancy signal in a certain LBT frequency band. For example, the base station allocates an interleaved resource block 3 to the UE as a frequency domain resource for sending the occupancy signal, and when the occupancy signal needs to be sent on both LBT frequency band 0 and LBT frequency band 1, the UE will send the occupancy signal on both the interleaved resource block 3 in LBT frequency band 0 and the interleaved resource block 3 in LBT frequency band 1.

External devices, etc., can determine the occupation of the LBT frequency band according to the sending of the occupancy signal on one or more interleaved resource blocks.

In this way, the interleaved resource block is used to send the occupancy signal, which, on the one hand, improves the coverage rate of the occupancy signal in the LBT frequency band, and thereby improving the detectability of the occupancy signal and the detection efficiency of the occupancy signal, and on the other hand, can meet the regulatory requirement of sending data in unlicensed frequency band, i.e., the signal sent by the sending end is required to occupy a predetermined proportion of the communication channel, such as 80% of the communication channel.

If the interleaved resource allocation method is not required, the base station can semi-statically allocate a segment of continuous frequency resources to the UE for sending CTS, e.g., the $10^{th}$ RB to the $11^{th}$ RB in the frequency LBT band are allocated to the UE for sending CTS, and when the CTS signal needs to be sent on both LBT frequency band 0 and LBT frequency band 1, the UE will send the CTS signal on the $10^{th}$ to $11^{th}$ RBs in LBT frequency band 0 and the $10^{th}$ to $11^{th}$ RBs in LBT frequency band 1.

Figure 8:
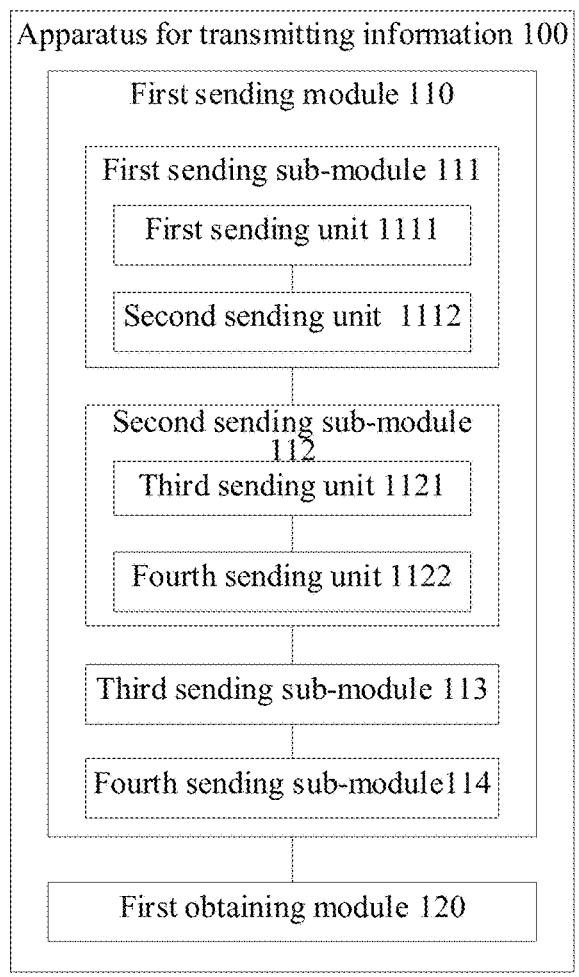
FIG. 8 is a block diagram of an apparatus for transmitting information illustrated in accordance with one or more examples of the present disclosure.

The embodiments of the present application further provide an apparatus for transmitting information, applied to UE as a terminal of the communication system. FIG. 8 is a schematic diagram of a composition structure of the apparatus 100 for transmitting information provided by the examples of the present application. As shown in FIG. 8, the apparatus 100 includes a first sending module 110.

The first sending module 110 is configured to send an occupancy signal in response to a DCI sent by a base station to the UE for scheduling a PDSCH resource in an unlicensed frequency spectrum being detected in a PDCCH resource of the unlicensed frequency spectrum.

The occupancy signal is used to indicate that a channel of the PDSCH resource is to be occupied.

In one example, there is a time interval between the PDCCH resource and the PDSCH resource, the PDCCH resource being located before the PDSCH resource in a time domain.

The first sending module 110 includes a first sending sub-module 111 configured to send the occupancy signal within a time window in the time interval.

In one example, the apparatus further includes a first obtaining module 120 is configured to obtain a minimum value of the time interval and/or the time window specified by a communication protocol or indicated by the base station.

In one example, the first sending sub-module 111 includes one of: a first sending unit 1111 configured to send the occupancy signal within a first number of symbols after the PDCCH resource; and a second sending unit 1112 configured to send the occupancy signal within a second number of symbols before the PDSCH resource.

In one example, the first sending module 110 includes a second sending sub-module 112 configured to send the occupancy signal in a listen before talk (LBT) frequency band to which the PDSCH resource belongs.

In one example, the occupancy signal is used to indicate that the LBT frequency band is to be occupied.

In one example, the second sending sub-module 112 includes one of: a third sending unit 1121 configured to send the occupancy signal using one or more interleaved resource blocks in the LBT frequency band, the one or more interleaved resource blocks comprising one or more resource blocks (RBs); and a fourth sending unit 1122 configured to send the occupancy signal using one or more RBs in the LBT frequency band.

In one example, the first sending module 110 includes a third sending sub-module 113 configured to perform a clear channel assessment for the LBT frequency band to which the PDSCH resource belongs; and send the occupancy signal in response to the LBT frequency band being idle.

In one example, the occupancy signal is further used to indicate that the base station is allowed to transmit downlink data using the PDSCH resource.

In one example, the first sending module 110 includes a fourth sending sub-module 114 configured to send the occupancy signal carrying identification information of the UE.

The identification information of the UE is used to determine by the base station the UE that sends the occupancy signal.

Figure 9:
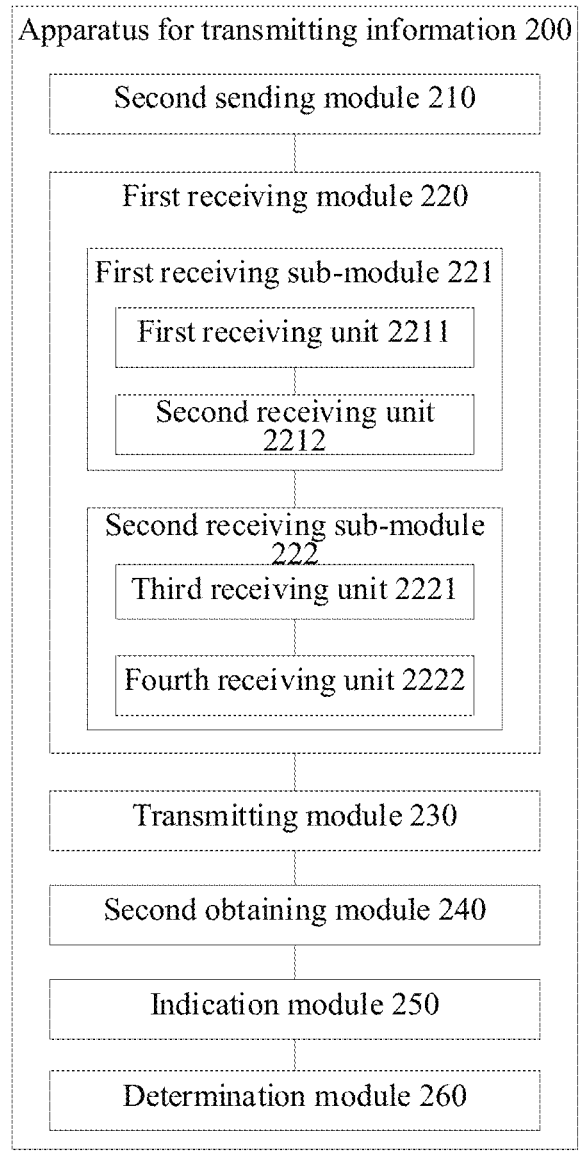
FIG. 9 is a block diagram of another apparatus for transmitting information illustrated in accordance with one or more examples of the present disclosure.

The examples of the present application further provide an apparatus for transmitting information, applied to a base station of the communication system. FIG. 9 is a schematic diagram of a composition structure of the apparatus 200 for transmitting information provided by the examples of the present application. As shown in FIG. 9, the apparatus 200 includes a second sending module 210, a first receiving module 220 and a transmission module 230.

The second sending module 210 is configured to send to UE a DCI for scheduling a PDSCH resource in an unlicensed frequency spectrum using a PDCCH resource of the unlicensed frequency spectrum.

The first receiving module 220 is configured to receive an occupancy signal sent by the UE in response to the DCI, where the occupancy signal is used to indicate that a channel corresponding to the PDSCH resource is to be occupied.

The transmission module 230 is configured to transmit downlink data on the PDSCH resource according to the occupancy signal.

In one example, there is a time interval between the PDCCH resource and the PDSCH resource, the PDCCH resource being located before the PDSCH resource in a time domain.

The first receiving module 220 includes a first receiving sub-module 221 configured to receive the occupancy signal within a time window in the time interval.

In one example, the apparatus further includes at least one of: a second obtaining module 240 configured to obtain a minimum value of the time interval and/or the time window specified by a communication protocol; and an indication module 250 configured to indicate to the UE a minimum value of the time interval and/or the time window.

In one example, the first receiving sub-module 221 includes one of: a first receiving unit 2211 configured to receive the occupancy signal within a first number of symbols after the PDCCH resource; and a second receiving unit 2212 configured to receive the occupancy signal within a second number of symbols before the PDSCH resource.

In one example, the first receiving module 220 includes a second receiving sub-module 222 configured to receive the occupancy signal in a listen before talk (LBT) frequency band to which the PDSCH resource belongs.

In one example, the occupancy signal is used to indicate that the LBT frequency band is to be occupied.

In one example, the second receiving sub-module 222 includes one of: a third receiving unit 2221 configured to receive the occupancy signal sent by the UE using one or more interleaved resource blocks in the LBT frequency band, the one or more interleaved resource blocks comprising one or more resource blocks (RBs); and a fourth receiving unit 2222 configured to receive the occupancy signal sent by the UE using one or more RBs in the LBT frequency band.

In one example, the occupancy signal carries identification information.

The apparatus 200 further includes a determination module 260 configured to determine the UE that sends the occupancy signal according to the identification information.

In one or more examples, the first sending module 110, the first obtaining module 120, the second sending module 210, the first receiving module 220, the transmission module 230, the second obtaining module 240, the indication module 250, and the determination module 260, among others, may be controlled by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate array (FPGA), general processors, controllers, micro controller units (MCUs), and Microprocessors; or may be implemented by other electronic components. It can also be implemented in combination with one or more radio frequency (RF) antennas to perform the aforementioned methods.

Figure 10:
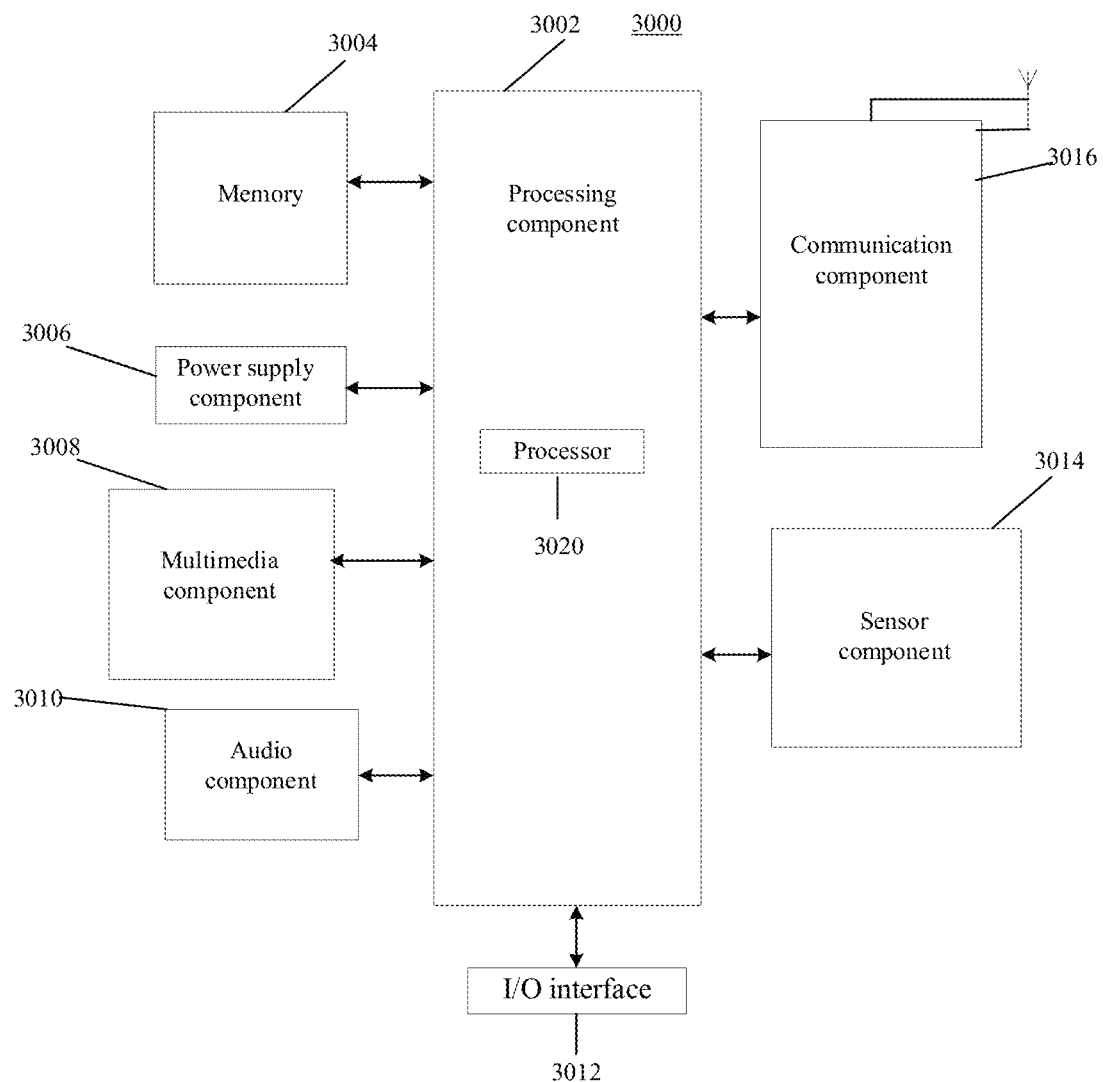
FIG. 10 is a block diagram of a device for information transmission illustrated in accordance with one or more examples of the present disclosure.

FIG. 10 is a block diagram of a device 3000 for transmitting information illustrated according to an example. For example, the device 3000 may be a mobile telephone, a computer, a digital broadcast terminal, a messaging device, a gaming console, a tablet, a medical device, exercise equipment, a personal digital assistant, and the like.

In one or more examples, the device 3000 may be implemented with one or more application specific integrated circuits (ASICs), digital signal processors (DSPs), digital signal processing devices (DSPDs), programmable logic devices (PLDs), field-programmable gate arrays (FPGAs), controllers, micro controllers, microprocessors, or other electronic elements, for performing the foregoing methods.

In one or more examples, there is also provided a non-transitory computer readable storage medium including instructions, such as included in the memory 3004, executable by the processor 3020 in the device 3000, for performing the foregoing methods. For example, the non-transitory computer readable storage medium may be a ROM, a random access memory (RAM), a CD-ROM, a magnetic tape, a floppy disc, an optical data storage device, and the like.

Other embodiments of the present disclosure will readily occur to those skilled in the art upon consideration of the specification and practice of the application disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, and the true scope and spirit of the disclosure being indicated by the following claims.

It should be understood that the embodiments of the present disclosure are not limited to the precise structures described above and illustrated in the accompanying drawings, and that various modifications and changes may be made without departing from the scope thereof. The scope of the present application is limited only by the scope of the appended claims.

What is claimed is:

1. A method for transmitting information, comprising:
   sending, by a User Equipment (UE), an occupancy signal in response to a downlink control information (DCI) sent by a base station to the UE for scheduling a physical downlink shared channel (PDSCH) resource in an unlicensed frequency spectrum, being detected in a physical downlink control channel (PDCCH) resource of the unlicensed frequency spectrum,
wherein the occupancy signal is configured to indicate that a channel corresponding to the PDSCH resource is to be occupied.

2. The method according to claim 1, wherein
a time interval exists between the PDCCH resource and the PDSCH resource, the PDCCH resource being located before the PDSCH resource in a time domain; and
wherein sending the occupancy signal comprises:
sending the occupancy signal within a time window in the time interval.

3. The method according to claim 2, further comprising at least one of:
obtaining a minimum value of the time interval specified by a communication protocol;
obtaining a minimum value of the time interval indicated by the base station;
obtaining the time window specified by a communication protocol; or
obtaining the time window indicated by the base station.

4. The method according to claim 3, wherein sending the occupancy signal within the time window in the time interval comprises one of:
sending the occupancy signal within a first number of symbols after the PDCCH resource; or
sending the occupancy signal within a second number of symbols before the PDSCH resource.

5. The method according to claim 1, wherein sending the occupancy signal comprises:
sending the occupancy signal in a listen before talk (LBT) frequency band to which the PDSCH resource belongs.

6. The method according to claim 5, wherein the occupancy signal is configured to indicate that the LBT frequency band is to be occupied.

7. The method according to claim 5, wherein sending the occupancy signal in the LBT frequency band to which the PDSCH resource belongs comprises one of:
sending the occupancy signal using at least one interleaved resource block in the LBT frequency band, the at least one interleaved resource block comprising at least one resource block (RB); or
sending the occupancy signal using at least one RB in the LBT frequency band.

8. The method according to claim 5, wherein sending the occupancy signal comprises:
performing a clear channel assessment for the LBT frequency band to which the PDSCH resource belongs; and
sending the occupancy signal in response to the LBT frequency band being idle.

9. The method according to claim 1, wherein the occupancy signal is further configured to indicate that the base station is allowed to transmit downlink data using the PDSCH resource.

10. The method according to claim 1, wherein sending the occupancy signal comprises:
sending the occupancy signal carrying identification information of the UE,
wherein the identification information of the UE is configured to determine by the base station, the UE that sends the occupancy signal.

11. A method for transmitting information, comprising:
sending, by a base station, to user equipment (UE) a downlink control information (DCI) for scheduling a physical downlink shared channel (PDSCH) resource in an unlicensed frequency spectrum using a physical downlink control channel (PDCCH) resource of the unlicensed frequency spectrum;
receiving, by the base station, an occupancy signal sent by the UE in response to the DCI, wherein the occupancy signal is configured to indicate that a channel corresponding to the PDSCH resource is to be occupied; and
transmitting, by the base station, downlink data on the PDSCH resource according to the occupancy signal.

12. The method according to claim 11, wherein
a time interval exists between the PDCCH resource and the PDSCH resource, the PDCCH resource being located before the PDSCH resource in a time domain; and
wherein receiving the occupancy signal sent by the UE in response to the DCI comprises:
receiving the occupancy signal within a time window in the time interval.

13. The method according to claim 12, further comprising at least one of:
obtaining a minimum value of the time interval specified by a communication protocol;
obtaining the time window specified by a communication protocol;
indicating to the UE a minimum value of the time interval; or
indicating to the UE the time window.

14. The method according to claim 12, wherein receiving the occupancy signal within the time window in the time interval comprises one of:
receiving the occupancy signal within a first number of symbols after the PDCCH resource; or
receiving the occupancy signal within a second number of symbols before the PDSCH resource.

15. The method according to claim 11, wherein receiving the occupancy signal sent by the UE in response to the DCI comprises:
receiving the occupancy signal in a listen before talk (LBT) frequency band to which the PDSCH resource belongs.

16. The method according to claim 15, wherein the occupancy signal is configured to indicate that the LBT frequency band is to be occupied.

17. The method according to claim 15, wherein receiving the occupancy signal in a LBT frequency band to which the PDSCH resource belongs comprises one of:
receiving the occupancy signal sent by the UE using at least one interleaved resource block in the LBT frequency band, the at least one interleaved resource block comprising at least one resource block (RB); or
receiving the occupancy signal sent by the UE using at least one RB in the LBT frequency band.

18. The method according to claim 11, wherein the occupancy signal carries identification information; and
the method further comprises:
determining the UE that sends the occupancy signal according to the identification information.

19. A communication device, comprising: a processor, a transceiver, a memory, and an executable program stored on the memory that can be run by the processor, wherein the processor, when running the executable program, implements following steps:
sending an occupancy signal in response to a downlink control information (DCI) sent by a base station to the communication device for scheduling a physical downlink shared channel (PDSCH) resource in an unlicensed frequency spectrum, being detected in a physical downlink control channel (PDCCH) resource of the unlicensed frequency spectrum, wherein the occupancy signal is configured to indicate that a channel corresponding to the PDSCH resource is to be occupied.

* * * * *